(12) United States Patent
Clerino et al.

(10) Patent No.: US 7,782,756 B2
(45) Date of Patent: Aug. 24, 2010

(54) APPARATUS FOR GENERATING SEQUENCES OF CODING ELEMENTS FOR A TRANSMISSION DEVICE IN A CDMA COMMUNICATION NETWORK

(75) Inventors: Antoine Clerino, Seysses (FR); Christian Peyrotte, Toulouse (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/092,857

(22) PCT Filed: Nov. 6, 2006

(86) PCT No.: PCT/FR2006/051138

§ 371 (c)(1),
(2), (4) Date: Oct. 6, 2008

(87) PCT Pub. No.: WO2007/051952

PCT Pub. Date: May 10, 2007

(65) Prior Publication Data

US 2009/0225785 A1 Sep. 10, 2009

(30) Foreign Application Priority Data

Nov. 7, 2005 (EP) .................. 05300897

(51) Int. Cl.
*H04J 11/00* (2006.01)
*H04B 7/216* (2006.01)
*G06F 17/14* (2006.01)

(52) U.S. Cl. .................. 370/208; 370/342; 708/410
(58) Field of Classification Search .................. None
See application file for complete search history.

(56) References Cited

U.S. PATENT DOCUMENTS

2004/0034676 A1* 2/2004 Reshef et al. .................. 708/400

(Continued)

FOREIGN PATENT DOCUMENTS

GB 2378362 A 2/2003

OTHER PUBLICATIONS

Kim, "Recursive generation of constant amplitude multi-code DS-CDMA signal", Dec. 11, 2003, Electonics Letters, vol. 39, pp. 1782-1783.*

(Continued)

*Primary Examiner*—Ricky Ngo
*Assistant Examiner*—Clemence Han
(74) *Attorney, Agent, or Firm*—Fay Sharpe LLP

(57) ABSTRACT

An apparatus (A) is dedicated to generating sequences of signal coding elements within a signal transmission device (TD) of a CDMA network. This apparatus (A) comprises calculation means (CM) tasked with i) constructing a 2×2 intermediary matrix ($M_K$) with rank K, where K is a selected odd-numbered integer value greater than or equal to 1, and comprising four matrix elements ($X_K$, $Y_K$, $Z_K$, $U_K$) each constructed from another 2×2 intermediary matrix with rank K−1, where $$X_K = \begin{pmatrix} X_{K-1} & X_{K-1} \\ X_{K-1} & -X_{K-1} \end{pmatrix}, Y_K = \begin{pmatrix} Y_{K-1} & -Y_{K-1} \\ -Y_{K-1} & -Y_{K-1} \end{pmatrix},$$

$$Z_K = \begin{pmatrix} Z_{K-1} & -Z_{K-1} \\ -Z_{K-1} & -Z_{K-1} \end{pmatrix}, U_K = \begin{pmatrix} U_{K-1} & U_{K-1} \\ U_{K-1} & -U_{K-1} \end{pmatrix},$$

$X_1=1$, $Y_1=-1$, $Z_1=1$, and $U_1=1$, then ii) converting the 2×2 intermediary matrix ($M_K$) with rank K into an N×N final matrix ($M'_K$) with rank K, where $N=2^K$, in which each element associated with one of the N rows and N columns is a value, and iii) delivering N sequences which are orthogonal to one another, each comprising N coding elements respectively constructed from the values of the elements contained within one of the N rows of the final matrix ($M'_K$). Each sequence may then be used to spread the signal spectra, said signals being associated with different communication channels, before being modulated and then transmitted.

7 Claims, 1 Drawing Sheet

U.S. PATENT DOCUMENTS

2004/0131009 A1* 7/2004 Pappalardo et al. ......... 370/208
2004/0199557 A1* 10/2004 Reshef et al. ............... 708/207
2005/0265224 A1* 12/2005 Lee et al. .................... 370/209
2006/0045369 A1* 3/2006 Nakayama ................. 382/248

OTHER PUBLICATIONS

Sari, "A generalization of multidimensional modulation", Jun. 18-22, 1995, Communications, 1995. ICC 95 Seattle, Gateway to Globalization International Conference on, vol. 2, pp. 683-687.*

Rao et al., "A novel method for constructing a set of Hadamard matrices", Apr. 1986, Acoustics, Speech, and Signal Processing, IEEE International Conference on ICASSP '86, vol. 11, pp. 993-996.*

H. Evangelaras et al, "Applications of Hdamard Matrices", Journal of Telecommunications and Information Technology, (Online), vol. 2, 2003, XP00237550.

Tran et al, "Complex orthogonal sequences from amicable hadamard matrices", Vehicular Technology Conference, 2004, VTC 2004-Spring. 2004 IEEE 59Th Milan, Italy, May 17-19, 2004, Piscataway, NJ, USA, IEEE, US, vol. 3, May 17, 2004, pp. 1490-1493—XP010766390.

* cited by examiner

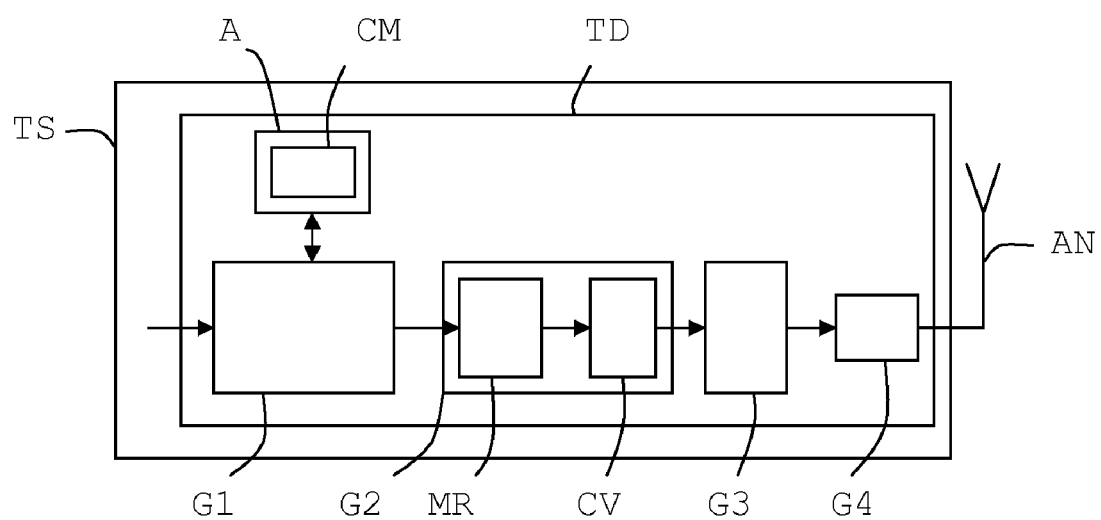
Sole figure

APPARATUS FOR GENERATING SEQUENCES OF CODING ELEMENTS FOR A TRANSMISSION DEVICE IN A CDMA COMMUNICATION NETWORK

The invention pertains to code division multiple access communication networks, and more precisely to apparatuses which are used in such networks to generate sequences of coding elements for spreading the spectra of signals before modulating them and then transmitting them.

As is known to a person skilled in the art, in so-called code division multiple access (or CDMA) networks, defined by the IS-95 standard, the signals, which are associated with a communication channel and which must be transmitted by a transmission device, have their spectra spread using sequences of code elements which are generally orthogonal to one another, after having been scrambled ("scrambling" being an action of mixing data that improves the performance of error correction codes) and then error-correction coded before being modulated and then transmitted.

Several families of sequences have been suggested to spread the signals and optimize the use of the spectrum by maximizing the number of simultaneous transmissions on the spread-spectrum range, in particular Gold code sequences and Walsh-Hadamard code sequences.

Gold code sequences are easy to generate, and offer fairly good (though not ideal) performance in terms of autocorrelation and cross-correlation when the impact of the data onto which they have been superimposed is not taken into account. The data changes the autocorrelation and cross-correlation values between the received sequence superimposed onto the data and the expected sequence.

Walsh-Hadamard code sequences offer near-perfect isolation (orthogonality) between sequences whenever the CDMA network is perfectly synchronized. However, as described later on, they exhibit a significant disadvantage that may impair synchronization.

To generate Walsh-Hadamard code sequences, a three-step method is always used. A first step consists of constructing a 2×2 intermediary matrix ($M_K$) whose rank is K, where K is a selected integer greater than or equal to 1, and comprising four matrix elements which are each constructed from an intermediary matrix ($M_{K-1}$) whose rank is K−1. More precisely, we have $$M_K = \begin{pmatrix} M_{K-1} & M_{K-1} \\ M_{K-1} & -M_{K-1} \end{pmatrix},$$

where $$M_1 = \begin{pmatrix} 1 & 1 \\ 1 & -1 \end{pmatrix}.$$

A second step consists of transforming the 2×2 intermediary matrix $M_K$ with rank K into an N×N final matrix with rang K, where $N=2^K$, in which each element associated with one of the N rows and one of the N columns is a value. A third step consists of delivering N sequences which are orthogonal to one another, each comprising N coding elements respectively constructed from the values of the elements which are contained within one of the N rows (or N columns) of the primary matrix ($M_K$).

For example, when K=2, the result is the following four sequences, which are generally orthogonal to one another, $S_{1/4}=(1,1,1,1)$, $S_{2/4}=(1.-1,1,-1)$, $S_{3/4}=(1,1,-1.-1)$ et $S_{4/4}=(1.-1.-1.1)$. The sequences $S_{2/4}$, $S_{3/4}$ and $S_{4/4}$ may be used to spread the spectra of the signals associated with three different communication channels, before they are modulated and then transmitted. The sequence $S_{1/4}$, which, after a fashion, corresponds to an identity function, is not used, because it cannot be used to spread the spectrum of a signal.

The Walsh-Hadamard code sequences have a mediocre autocorrelation function, even when the impact of the data onto which they are superimposed is not taken into account (secondary peaks may have the same level as a primary peak), which causes problems during the acquisition phases, particularly when the number N of coding elements in the sequence is equal to 128, therefore impairing synchronization. As a reminder, the lower the secondary autocorrelation peak levels are, the lower the likelihood of false acquisition is.

In order to reduce the levels of secondary peaks, one may scramble Walsh-Hadamard code sequences with extended Gold code sequences.

This scrambling also makes it possible to achieve a very high cross-correlation function when the impact of the data onto which the mixed sequences are superimposed is taken into account, including when the number N of coding elements in the sequence is equal to 128, which is important during the later phases. As a reminder, the lower the cross-correlation peak levels are, the lower the level of (MAI) interference.

The purpose of the invention is to enable the generation of new families of sequences of coding elements exhibiting a very high cross-correlation function, as with Walsh-Hadamard code sequences, and a very high autocorrelation function in which the levels of the secondary peaks are very low, or even near-zero, as with Gold code sequences.

To that end, it discloses an apparatus dedicated to generating sequences of signal coding elements, for a device for transmitting signals on a CDMA network, and comprising calculation means tasked with:

constructing a 2×2 intermediary matrix ($M_K$) with rank K, where K is a selected integer greater than or equal to 1, and comprising four matrix elements each constructed from another 2×2 intermediary matrix, with rank K−1, then converting the 2×2 intermediary matrix ($M_K$) with rank K into an N×N final matrix ($M'_K$) with rank K, where $N=2^K$, in which each element associated with one of the N rows and one of the N columns is a value, and to deliver N sequences that are orthogonal to one another, each comprising N coding elements respectively made up of the values of the elements which are contained within one of the N rows of the final matrix ($M'_K$), each of said sequences having the potential to be used to spread the spectra of signals, which are associated with different communication channels, before they are modulated and then transmitted.

This apparatus is characterized in that its calculation means are tasked with constructing each intermediary matrix with rank K ($M_K$) by using an odd-numbered value K and four matrix elements ($X_K$, $Y_K$, $Z_K$, $U_K$) defined as follows:

$$-X_K = \begin{pmatrix} X_{K-1} & X_{K-1} \\ X_{K-1} & -X_{K-1} \end{pmatrix},$$

where $X_1=1$, $$-Y_K = \begin{pmatrix} Y_{K-1} & -Y_{K-1} \\ -Y_{K-1} & -Y_{K-1} \end{pmatrix},$$

where $Y_1 = -1$, $$-Z_K = \begin{pmatrix} Z_{K-1} & -Z_{K-1} \\ -Z_{K-1} & -Z_{K-1} \end{pmatrix},$$

where $Z_1 = 1$, and $$-U_K = \begin{pmatrix} U_{K-1} & U_{K-1} \\ U_{K-1} & -U_{K-1} \end{pmatrix},$$

where $U_1 = 1$.

Preferentially, the calculation means may be tasked with constructing intermediate matrices with rank K and whose type is $$M_K = \begin{pmatrix} X_K & Y_K \\ Z_K & U_K \end{pmatrix}.$$

Furthermore, the calculation means may also be tasked with determining extended Gold code sequences, and with scrambling at least some of said extended Gold code sequences with at least the sequences of coding elements.

The invention also discloses a signal transmission device for a CDMA network, equipped with an apparatus for generating sequences of signal coding elements of the type mentioned above.

The invention further discloses a method for generating sequences of signal coding elements, consisting of the following series of steps:

1) constructing a 2×2 intermediary matrix ($M_K$) with rank K, where K is a selected odd-numbered integer value greater than 1, and comprising four matrix elements ($X_K, Y_K, Z_K, U_K$) each constructed from another 2×2 intermediary matrix with rank K–1, and defined as follows:

$$-X_K = \begin{pmatrix} X_{K-1} & X_{K-1} \\ X_{K-1} & -X_{K-1} \end{pmatrix},$$

where $X_1 = 1$, $$-Y_K = \begin{pmatrix} Y_{K-1} & -Y_{K-1} \\ -Y_{K-1} & -Y_{K-1} \end{pmatrix},$$

where $Y_1 = -1$, $$-Z_K = \begin{pmatrix} Z_{K-1} & -Z_{K-1} \\ -Z_{K-1} & -Z_{K-1} \end{pmatrix},$$

where $Z_1 = 1$, and $$-U_K = \begin{pmatrix} U_{K-1} & U_{K-1} \\ U_{K-1} & -U_{K-1} \end{pmatrix},$$

where $U_1 = 1$, 2) transforming the 2×2 matrix ($M_K$) with rank K into an N×N final matrix ($M'_K$) with rank K, where $N=2^K$, in which each element associated with one of the N rows and one of the N columns is a value, and 3) delivering N sequences which are orthogonal to one another, each comprising N coding elements respectively constructed from the values of the elements contained within one of the N lines of the final matrix ($M'_K$), each of said sequences having the potential to be used to spread the signal spectra, said signals being associated with different communication channels before being modulated and then transmitted.

$$M_K = \begin{pmatrix} X_K & Y_K \\ Z_K & U_K \end{pmatrix}$$

In step 2), a intermediary matrix with rank K is preferentially constructed.

Furthermore, one may also determine extended Gold code sequences, and scramble at least some of said extended Gold code sequences with at least some of the sequences of coding elements determined in step 3).

Other characteristics and advantages will become more apparent upon consideration of the detailed description below, as well as the attached drawing, in which the sole FIGURE schematically depicts a transmission device equipped with an example embodiment of an apparatus of the invention for generating sequences of signal coding elements. The attached drawing may serve not only to complete the invention, but also contribute to defining it, if need be.

In the following, by way of a non-limiting example, the apparatus of the invention for generating sequences of signal coding elements A is presumed to form part of a transmission device TD, such as a signal transmission circuit (itself potentially forming part of a transceiver circuit), in a communication terminal TS on a CDMA communication network. Such a communication terminal TS may, for example, be a transceiver station (or base station) associated with at least one cell of a mobile (or cellular) network.

Naturally, the invention is not limited to this example application. Instead, it pertains to any sort of transmission device intended to ensure the processing and arrangement of signals associated with different communication channels (and therefore different users) and which are to be transmitted, potentially in the form of waves (i.e. by radio waves), particularly after having been scrambled by scrambling technique (if any), then encoded, then spread using at least one sequence of CDMA coding elements, and modulated. The invention therefore applies to fixed CDMA networks installed in the ground.

Furthermore, the apparatus A of the invention may be outside the transmission device TD, while still being coupled to it, in order to supply it with sequences of coding elements.

As is schematically depicted in the sole FIGURE, a transmission device TD, such as a circuit dedicated to transmitting signals, comprises first G1, second G2, third G3, and fourth G4 stages coupled to one another.

The first stage G1 is a digital processing stage, generally baseband. In this first stage G1, each signal (to be transmitted), provided in digital form by another circuit of the transceiver station TS, is, in particular, encoded, then has its spectrum spread using a sequence of coding elements (or a code sequence) provided by an apparatus of the invention A.

In the non-limiting example depicted in the sole FIGURE, the apparatus A is outside the first stage G1. However, in a variant it may be integrated into said first stage G1.

The second stage G2 is also a digital processing stage. The digital signal that was encoded, and whose spectrum was spread, is first modulated using a modulator MR, and then converted into analog signals using a digital/analog converter CV.

The third stage G3 is an analog processing stage. In this stage, the analog signal is, in particular, filtered, and converted into a radio signal (RF), particularly if it was, up to that point, being broadcast in baseband.

The fourth stage G4 is a stage of amplifying the power that supplies the transmission antenna TA of the transceiver station TS.

The apparatus of the invention for generating sequences of signal coding elements A essentially comprises a calculating module CM.

This calculating module is tasked with generating, upon request (here, from the first stage G1) sequences that are orthogonal (or quasi-orthogonal) with coding elements. To do so, it follows a three-step process.

In a first step, the calculating module CM constructs an intermediary matrix $M_K$, where K is a selected integer greater than or equal to 1, designating the rank of said matrix $M_K$.

This intermediary matrix $M_K$ comprises four matrix elements $X_K$, $Y_K$, $Z_K$ and $U_K$. It therefore appears in the form of a 2×2 matrix of the type given below:

$$M_K = \begin{pmatrix} X_K & Y_K \\ Z_K & U_K \end{pmatrix}.$$

Each matrix element of the intermediary matrix $M_K$ is constructed from a 2×2 intermediary matrix with rank K−1, where K is strictly greater than 1 (K>1), and a simple value when K is equal to 1.

More precisely, in the invention, the matrix elements of the intermediary matrix $M_K$ are defined as indicated below:

$$-X_K = \begin{pmatrix} X_{K-1} & X_{K-1} \\ X_{K-1} & -X_{K-1} \end{pmatrix},$$

where $X_1 = 1$, $$-Y_K \begin{pmatrix} Y_{K-1} & -Y_{K-1} \\ -Y_{K-1} & -Y_{K-1} \end{pmatrix},$$

where $Y_1 = -1$, $$-Z_K = \begin{pmatrix} Z_{K-1} & -Z_{K-1} \\ -Z_{K-1} & -Z_{K-1} \end{pmatrix},$$

where $Z_1 = 1$, and $$-U_K = \begin{pmatrix} U_{K-1} & U_{K-1} \\ U_{K-1} & -U_{K-1} \end{pmatrix},$$

where $U_1 = 1$.

In a second step, the calculating module CM determines the four matrix elements $X_K$, $Y_K$, $Z_K$ and $U_K$ of the intermediary matrix $M_K$, whose odd-numbered integer value with rank K is generally chosen based on the maximum capacity of the system, in order to construct a final matrix $M'_K$. This involves transforming the 2×2 intermediary matrix $M_K$ (when it is viewed with respect to its matrix elements) with rank K into an N×N final matrix $M'_K$ with rank K, where $N=2^K$. The reason that N is equal to $2^K$ is that the four matrix elements of the intermediary matrix $M_K$ with rank K are themselves intermediary matrices with rank K−1 whose matrix elements are themselves intermediary matrices with rank K−2, and so on (for values of K greater than 2).

The final matrix $M'_K$ therefore comprises N rows and N columns, and its $N^2$ elements, which are each associated with one of its N rows and one of its N columns, are all values equal to $X_1$, $Y_1$, $Z_1$ or $U_1$ (i.e. equal to +1 or −1).

As the values of K are odd-numbered, N ($=2^K$) therefore takes such values as 2 ($2^1$), 8 ($2^3$), 32 ($2^5$), 128 ($2^7$), etc.

It should be noted that the separation of the first and second steps does not necessarily reflect the procedure of the calculating module CM. The first and second steps may be merged together instead.

In a third step, the calculating module CM delivers N sequences, known as $S_{iN}$ for short (where i=1 to N), which are orthogonal or near-orthogonal to one another, and each comprising N coding elements respectively constructed of values of elements which are contained within one of the N rows of the final matrix $M'_K$.

The orthogonality between sequences may be expressed through the following relationship:

$$S_{iN} * (S_{i'N})^T = \sum_{m=1}^{N} S_{imN} * S_{i'mN} = N\delta_{ii'},$$

where * represents the scalar product, T represents the transposed operator, $S_{imN}$ represents the m-th coding element of the sequence $S_{iN}$, and $\delta_{ii}$ is the Kronecker symbol which is equal to 0 when i is different from i', and equal to 1 when i is equal to i'.

For example, if K=3, then N=8, and each sequence comprises 8 coding elements. The 8 sequences $S_{18}$ to $S_{88}$ are given below:

$S_{18}$=(1,1,1,1,−1,1,1,−1),
$S_{28}$=(1.−1,1,−1,1,1,−1.−1),
$S_{38}$=(1,1,−1.−1,1,−1,1,−1),
$S_{48}$=(1.−1.−1,1,−1.−1.−1.−1),
$S_{58}$=(1.−1.−1,1,1,1,1,1),
$S_{68}$=(−1.−1,1,1,1,−1,1,−1),
$S_{78}$=(−1,1,−1,1,1,1,−1.−1),
$S_{88}$=(1,1,1,1,1,−1.−1.1).

Each of the N sequences $S_{iN}$, delivered by the apparatus A, may then be used (here by the first stage G1 of the transmission device TD) to spread the spectrum of a signal to be transmitted, said signal being associated with a communication channel, before it is modulated by the modulator MR of the second stage G2.

The new sequences of coding elements (or code sequences) $S_{iN}$ generated using the invention have a fairly high autocorrelation function when the impact of the data onto which they are superimposed is taken into account (the secondary peaks do indeed have levels less than those of the main peaks), including when their number N of code elements is equal to 128.

As is the case when using Walsh-Hadamard code sequences, the levels of the secondary peaks (of the autocorrelation function) can be reduced by scrambling the new sequences of coding elements $S_{iN}$ with extended Gold code sequences.

To that end, the calculating module CM may also be configured in such a way as to conventionally determine extended Gold code sequences. As the method used to determine such Gold code sequences is well known to a person skilled in the art, it will not be described here.

In such a case, the apparatus A, and more precisely its calculating module CM, calculates both the new sequences of coding elements $S_{iN}$ and extended Gold code sequences, with identical numbers N of coding elements, then chooses some of said new sequences of coding elements $S_{iN}$ and some of said extended Gold code sequences, and finally delivers, as output, a scrambling of the new sequences of coding elements $S_{iN}$ and the selected extended Gold code sequences. The choice may, for example, be predetermined based on prior studies.

Such a scrambling of sequences makes it possible to achieve a high cross-correlation function when the impact of the data onto which the scrambled sequences are superimposed is taken into account, including when the number N of coding elements in the sequence is equal to 128.

The apparatus of the invention for generating sequences of signal coding elements A, and in particular its calculating module CM, may be constructed in the form of electronic circuits, software (or computing) modules, or a combination of circuits and software.

The invention is not limited to the embodiments of the apparatus for generating sequences of signal coding elements described above, which are only given by way of example; rather, it encompasses all variants that a person skilled in the art may envision within the framework of the claims below.

The invention claimed is:

1. An apparatus (A) for generating sequences of signal coding elements for a signal transmission device (TD) on a code division multiple access communication network, said apparatus (A) comprising calculation means (CM) configured i) to construct a 2×2 intermediary matrix ($M_K$) with rank K, where K is a selected integer greater than or equal to 1, and comprising four matrix elements each constructed of another 2×2 intermediary matrix with rank K−1, then ii) to convert said 2×2 intermediary matrix ($M_K$) with rank K into an N×N final matrix ($M'_K$) with rank K, where $N=2^K$, in which each element associated with one of the N rows and one of the N columns is a value, and iii) to deliver N sequences that are orthogonal to one another, each comprising N coding elements respectively constructed from the values of the elements contained within one of the N lines of said final matrix ($M'_K$), and each capable of serving to spread signal spectra of signals, said signals being associated with different communication channels, before they are modulated and then transmitted, characterized in that said calculation means (CM) are configured to construct each intermediary matrix with rank K ($M_K$) using an odd-numbered value K and four matrix elements ($X_K, Y_K, Z_K, U_K$) defined as follows:

$$-X_K = \begin{pmatrix} X_{K-1} & X_{K-1} \\ X_{K-1} & -X_{K-1} \end{pmatrix},$$

where $X_1=1$, $$-Y_K \begin{pmatrix} Y_{K-1} & -Y_{K-1} \\ -Y_{K-1} & -Y_{K-1} \end{pmatrix},$$

where $Y_1=-1$, $$-Z_K = \begin{pmatrix} Z_{K-1} & -Z_{K-1} \\ -Z_{K-1} & -Z_{K-1} \end{pmatrix},$$

where $Z_1=1$, and $$-U_K = \begin{pmatrix} U_{K-1} & U_{K-1} \\ U_{K-1} & -U_{K-1} \end{pmatrix},$$

where $U_1=1$.

2. An apparatus according to claim 1, characterized in that said calculation means (CM) are configured to construct intermediary matrices with rank K and type $$M_K = \begin{pmatrix} X_K & Y_K \\ Z_K & U_K \end{pmatrix}.$$

3. An apparatus according to claim 1, characterized in that said calculation means are configured to determine extended Gold code sequences, and to scramble at least some of said extended Gold code sequences with at least some of said sequences of coding elements.

4. The signal transmission device (TD) for the code division multiple access communication network, characterized in that it comprises the apparatus for generating sequences of coding signal elements (A) according to claim 1.

5. A method for generating sequences of signal coding elements, for a signal transmission device (TD) of a code division multiple access communication, comprising: i) a calculating module constructing a 2×2 intermediary matrix ($M_K$) with rank K, where K is a selected integer greater than or equal to 1, and comprising four matrix elements each constructed from another 2×2 intermediary matrix with rank K−1, then ii) converting said 2×2 intermediary matrix ($M_K$) with rank K into an N×N final matrix ($M'_K$) with rank K, where $N=2^K$, in which each element associated with one of the N rows and one of the N columns is a value, and iii) delivering N sequences which are orthogonal to one another, each comprising N coding elements respectively constructed from values of the elements contained within one of the N lines of said final matrix ($M'_K$), and each capable of being used to spread signal spectra of signals, said signals being associated with different communication channels before they are modulated and then transmitted, characterized in that in step i) each intermediary matrix with rank K ($M_K$) is constructed using an odd-numbered value K and four matrix elements ($X_K, Y_K, Z_K, U_K$) defined as follows:

$$-X_K = \begin{pmatrix} X_{K-1} & X_{K-1} \\ X_{K-1} & -X_{K-1} \end{pmatrix},$$

where $X_1=1$, $$-Y_K \begin{pmatrix} Y_{K-1} & -Y_{K-1} \\ -Y_{K-1} & -Y_{K-1} \end{pmatrix},$$

where $Y_1 = -1$, $$-Z_K = \begin{pmatrix} Z_{K-1} & -Z_{K-1} \\ -Z_{K-1} & -Z_{K-1} \end{pmatrix},$$

where $Z_1 = 1$, and $$-U_K = \begin{pmatrix} U_{K-1} & U_{K-1} \\ U_{K-1} & -U_{K-1} \end{pmatrix},$$

where $U_1 = 1$.

6. A method according to claim 5, characterized in that in step i) an intermediary matrix with rank K and type $$M_K = \begin{pmatrix} X_K & Y_K \\ Z_K & U_K \end{pmatrix}$$

is constructed.

7. A method according to claim 5, characterized in that extended Gold code sequences are also determined, and at least some of said extended Gold code sequences are scrambled with at least some of said sequences of coding elements determined in step iii).

* * * * *